United States Patent [19]
Collins

[11] Patent Number: 5,522,619
[45] Date of Patent: Jun. 4, 1996

[54] END RELEASE SEAT BELT BUCKLE HAVING AN INERTIA-SENSITIVE LOCKING MECHANISM

[75] Inventor: Cecil A. Collins, Shelby Township, Mich.

[73] Assignee: AlliedSignal Inc., Morristown, N.J.

[21] Appl. No.: 382,072

[22] Filed: Feb. 1, 1995

[51] Int. Cl.⁶ .............................. A44B 11/26; B60R 22/46
[52] U.S. Cl. ................... 280/806; 24/633; 24/641
[58] Field of Search .......................... 24/633, 640, 641, 24/642; 280/806; 297/480

[56] References Cited

U.S. PATENT DOCUMENTS

| 3,606,378 | 9/1971 | Prostran | 280/806 |
|---|---|---|---|
| 3,871,470 | 3/1975 | Schwanz et al. | 280/806 |
| 4,913,497 | 4/1990 | Knabel et al. | 280/806 |
| 4,917,210 | 4/1990 | Danicek et al. | 280/806 |
| 4,928,366 | 5/1990 | Ballet | 24/641 |
| 4,999,004 | 3/1991 | Skanberg et al. | 280/806 |
| 5,039,127 | 8/1991 | Fohl | 280/806 |
| 5,066,042 | 11/1991 | Fohl | 280/806 |
| 5,097,571 | 3/1992 | Fohl | 24/641 |
| 5,115,543 | 5/1992 | Fohl | 24/633 |
| 5,121,887 | 6/1992 | Schmidt et al. | 242/385.2 |
| 5,211,423 | 5/1993 | Krambeck | 280/806 |
| 5,213,365 | 5/1993 | Fohl | 280/806 |
| 5,309,611 | 5/1994 | Wier et al. | 24/641 |
| 5,364,129 | 11/1994 | Collins et al. | 280/806 |
| 5,426,834 | 6/1995 | Collins et al. | 24/641 |

FOREIGN PATENT DOCUMENTS 4224324  1/1993  Germany.
55-30366  8/1980  Japan.

OTHER PUBLICATIONS

Popular Science, Sep., 1989, Automotive Newsfront by Dan McCosh, p. 28.

Primary Examiner—Margaret A. Focarino
Assistant Examiner—Peter C. English
Attorney, Agent, or Firm—Harness, Dickey & Pierce

[57] ABSTRACT

The present invention is directed to an end release belt buckle that is operable for releasable latching a tongue plate of a vehicular safety belt restraint system. The end release belt buckle of the present invention includes a base having a latch portion adapted to lockingly engage the tongue plate. The end release belt buckle further includes a release mechanism for permitting the seat occupant to intentionally release the tongue plate from locked engagement with the latch portion of the base in response to movement of a push-button actuator from a "latched" position to a "released" position. The push-button actuator is normally biased to the "latched" position by a spring-biasing mechanism. In addition, the end release belt buckle further includes a locking mechanism for inhibiting unintentional movement of the push-button actuator from the "latched" position to the "released" position when the vehicle is subjected to a deceleration force exceeding a predetermined threshold value.

17 Claims, 5 Drawing Sheets

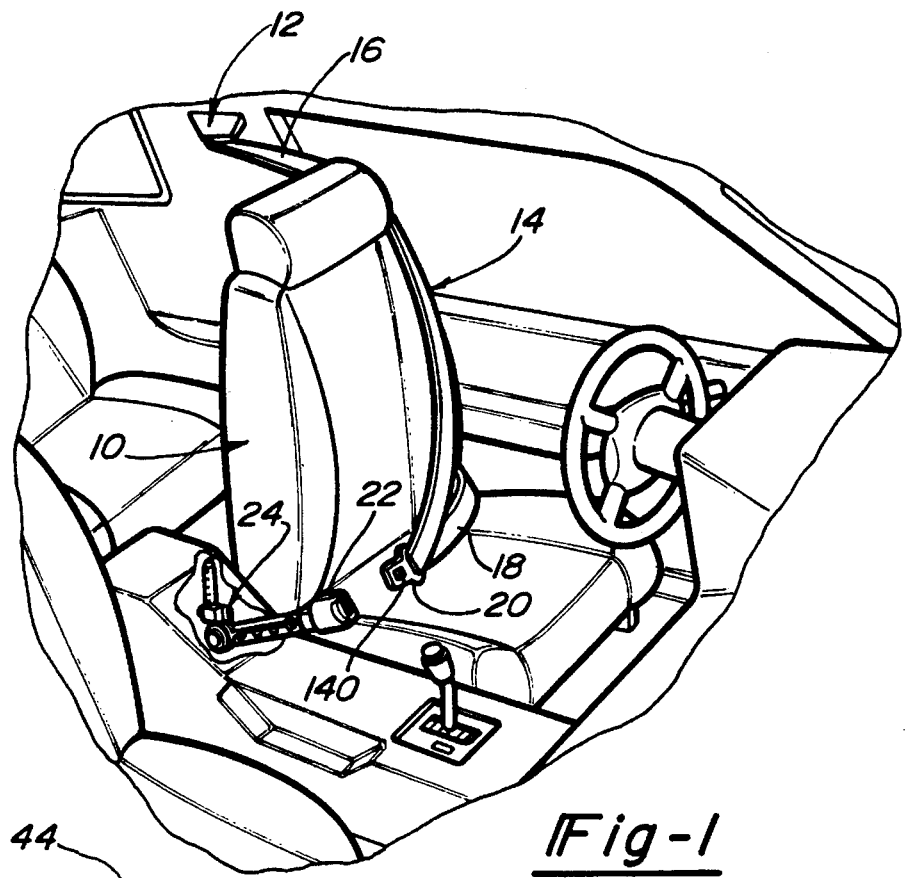
Fig-1
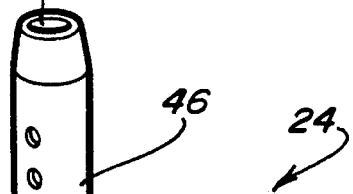
Fig-2
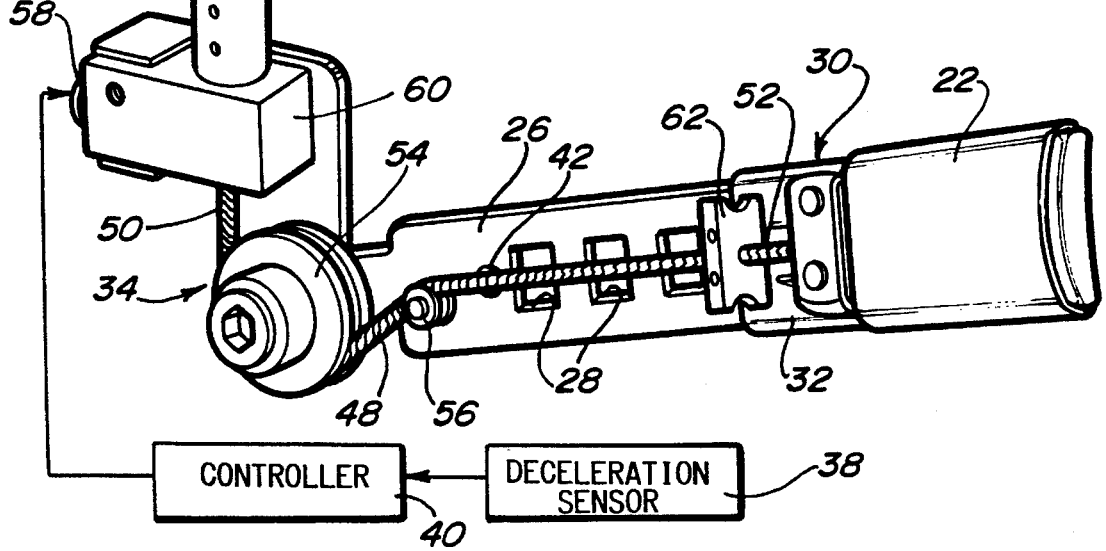

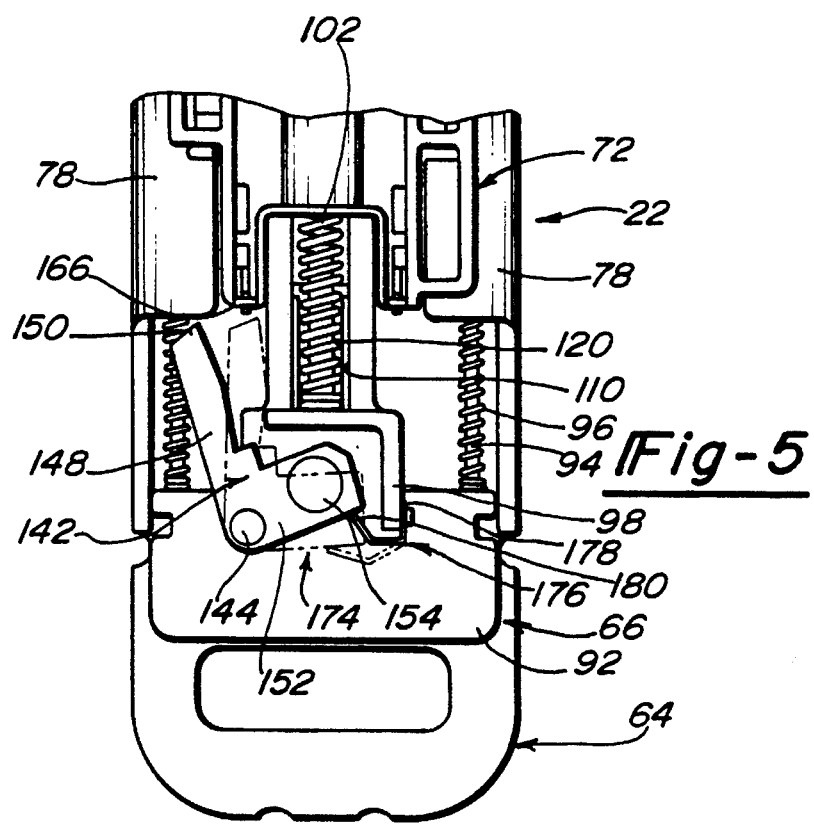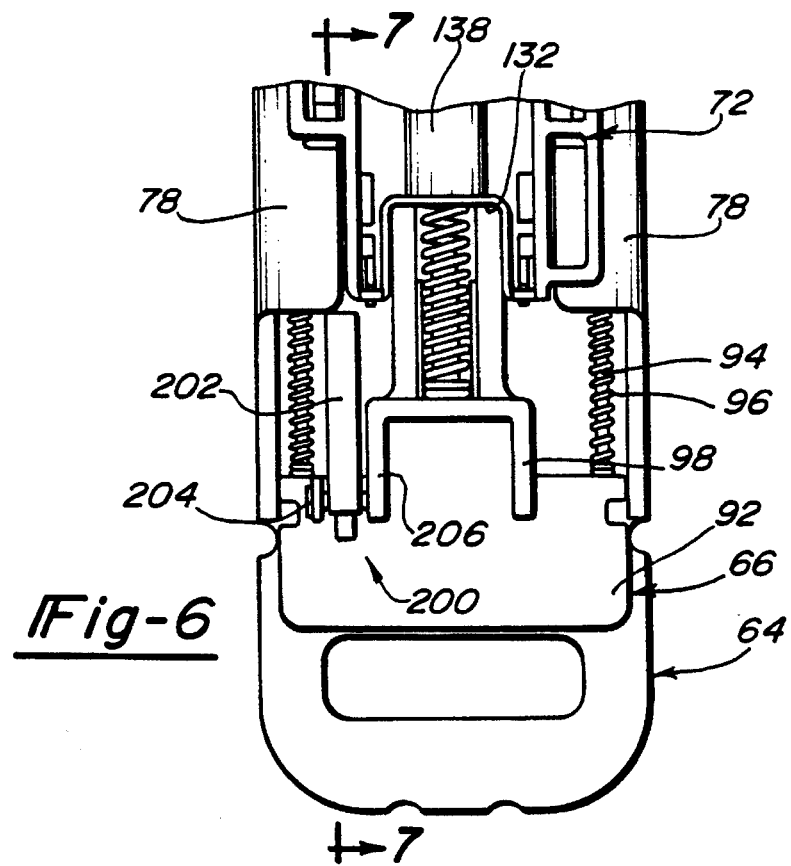

END RELEASE SEAT BELT BUCKLE HAVING AN INERTIA-SENSITIVE LOCKING MECHANISM

BACKGROUND OF THE INVENTION

The present invention relates generally to safety belt restraint systems for motor vehicles and, more particularly, to an end release seat belt buckle equipped with an inertia-sensitive locking mechanism for inhibiting release of the tongue plate from latched engagement with the seat belt buckle when the vehicle is subjected to a deceleration force exceeding a predetermined value.

Modernly, virtually all motor vehicles are equipped with some type of passenger restraint system for physically restraining the seat occupant when the vehicle is subjected to high rates of deceleration which may occur, for example, during heaving braking or collision. As is known, the most common type of passenger restraint system is a seat belt system having at least one of a lap belt and a shoulder belt, or combination thereof, that can be withdrawn from a retractor device for latched engagement of a tongue plate with an anchored belt buckle. One type of retractor, commonly referred to as an "Emergency Locking Retractor" (ELR), is operable to permit the seat belt to be freely withdrawn from the retractor in response to movement of the seat occupant during normal vehicular operating circumstances, thereby providing increased comfort and freedom of movement for the seat occupant. In this mode of operation, the retractor exerts a retractive tensioning force on the seat belt for tightening it against the seat occupant. Moreover, emergency locking retractors also include a locking mechanism for inhibiting withdrawal of the seat belt when the vehicle is subjected to a deceleration force exceeding a predetermined critical value, thereby restraining the vehicle occupant. In many instances, the locking mechanism is "inertia-sensitive" and is actuated in response to the deceleration force being exerted thereon.

In addition, many retractors are also equipped with a tension release device or so-called "comfort" mechanism that can be selectively actuated to prevent the retractor from exerting the above-noted tensioning force on the seat belt which may be uncomfortable and annoying to some seat occupants. However, the "slack" generated by the comfort mechanism can thereafter be cancelled by withdrawing a relatively short length of the seat belt from the retractor. An example of such a seat belt retractor is shown and disclosed in commonly owned U.S. Pat. No. 5,121,887 entitled "Comfort Mechanism For Seat Belt Retractor Assembly".

It is known that the existence of "slack" in the seat belt may permit the seat occupant to be thrown forward and collide with on-board structures when the vehicle is subjected to a large deceleration force. To prevent such collisions, the protection afforded by conventional seat belt systems can be further enhanced by the use of a belt tensioning mechanism. In general, a belt tensioning mechanism functions, in conjunction with lock-up of the retractor, to remove slack from the seat belt immediately upon detection of the deceleration force. As such, forward excursions of the seat occupant are significantly minimized. In some restraint systems, the belt tensioning mechanism is coupled to the belt buckle for causing retractive movement thereof so as to remove slack and exert a tensioning load on the seat occupant. As will be appreciated, the belt tensioning mechanism must be equipped with a large pre-loaded drive arrangement (i.e., pre-loaded spring, pyrotechnic device, etc.) that can be automatically triggered for retracting the belt buckle in response to detection of the vehicular deceleration condition. Examples of mechanically-actuated and electronically-actuated "buckle-type" belt tensioning mechanisms are respectively shown in commonly owned U.S. Pat. Nos. 5,211,423 and 5,364,129.

While the incorporation of a buckle-type belt tensioning mechanism into vehicular safety belt restraint systems is a highly desirable feature, various design considerations regarding the remainder of the system must be addressed. In particular, the belt buckle must be capable of maintaining latched engagement with the tongue plate during its retractive movement despite the extremely high acceleration loading (i.e., greater than 200 g's) exerted on the belt buckle upon activation of the belt tensioning mechanism. This concern is particularly applicable to "end release" type belt buckles which have a spring-biased release button that is longitudinally movable in a direction substantially parallel to the direction of the retractive movement of the belt buckle. The release button is normally biased toward a latched position and, under normal vehicular conditions, must be forcibly moved to an unlatched position in opposition to the biasing for releasing the tongue plate from latched engagement with the belt buckle. However, when the buckle-type belt tensioning mechanism is activated and the belt buckle is completely retracted, the inertia acting on the release button may overcome the biasing and forcibly move the release button to its unlatched position.

In view of the foregoing, the need exists to provide an end release belt buckle having means for inhibiting unintentional release of the tongue plate during a vehicular deceleration and yet which can be easily manufactured and assembled.

SUMMARY OF THE INVENTION

Accordingly, the present invention is directed to an end release belt buckle that is operable for releasably latching a tongue plate of a vehicular safety belt restraint system. The end release belt buckle of the present invention includes a base having a latch portion adapted to lockingly engage the tongue plate. The end release belt buckle further includes a release mechanism for permitting the seat occupant to intentionally release the tongue plate from locked engagement with the latch portion of the base in response to movement of a push-button actuator from a "latched" position to a "released" position. The push-button actuator is normally biased to the "latched" position by a spring-biasing mechanism. In addition, the end release belt buckle further includes a locking mechanism for inhibiting unintentional movement of the push-button actuator from the "latched" position to the "released" position when the vehicle is subjected to a deceleration force exceeding a predetermined threshold value.

As a related object, the locking mechanism for the end release belt buckle is an inertia-sensitive device that is normally operable in a "non-actuated" mode for permitting selective movement of the push-button actuator to its "released" position, and which is automatically shifted into an "actuated" mode for inhibiting such movement of the push-button actuator in response to the vehicular deceleration condition. Thus, the present invention is directed to incorporating a highly reliable inertia-sensitive locking mechanism into an end release belt buckle that will prevent unintentional release of the tongue plate during a vehicular deceleration condition, yet allow the occupant to freely use the push button actuator to release the tongue plate during normal conditions.

A further object of the present invention is to provide a light weight and inexpensive inertia-sensitive locking mechanism that can be easily integrated into current end release belt buckle designs.

The inertia-sensitive locking mechanism of the present invention can be designed for application to virtually any end release belt buckles. It can also be specifically designed to operate under a broad range of vehicular deceleration conditions. The components associated with the inertia-sensitive locking mechanism can be manufactured from any suitable material (i.e., plastic, metal, or alloy), and can employ various spring-biasing and weighting arrangements to adapt the locking mechanism for various inertial loading situations.

Additional benefits and advantages of the present invention will become apparent to those skilled in the art to which this invention relates from the subsequent description of the preferred embodiments and appended claims, taken in conjunction with the accompanying drawings.

BRIEF DESCRIPTION OF THE DRAWINGS

FIG. 1 is a partial interior view of an exemplary motor vehicle showing the functional relationship between a vehicular safety belt restraint system and a buckle-type belt tensioning mechanism having an end release seat belt buckle equipped with an inertia-sensitive locking mechanism constructed according to any one of the preferred embodiments of the present invention;

FIG. 2 is an enlarged perspective view of the buckle-type belt tensioning mechanism shown in FIG. 1;

FIG. 5 shows an alternative biasing arrangement for the inertia-sensitive locking mechanism shown in FIGS. 3 through 4B;

FIG. 6 is a top view of the end release belt buckle equipped with an inertia-sensitive locking mechanism constructed according to yet another embodiment of the present invention;

DETAILED DESCRIPTION OF THE INVENTION

Figure 3:
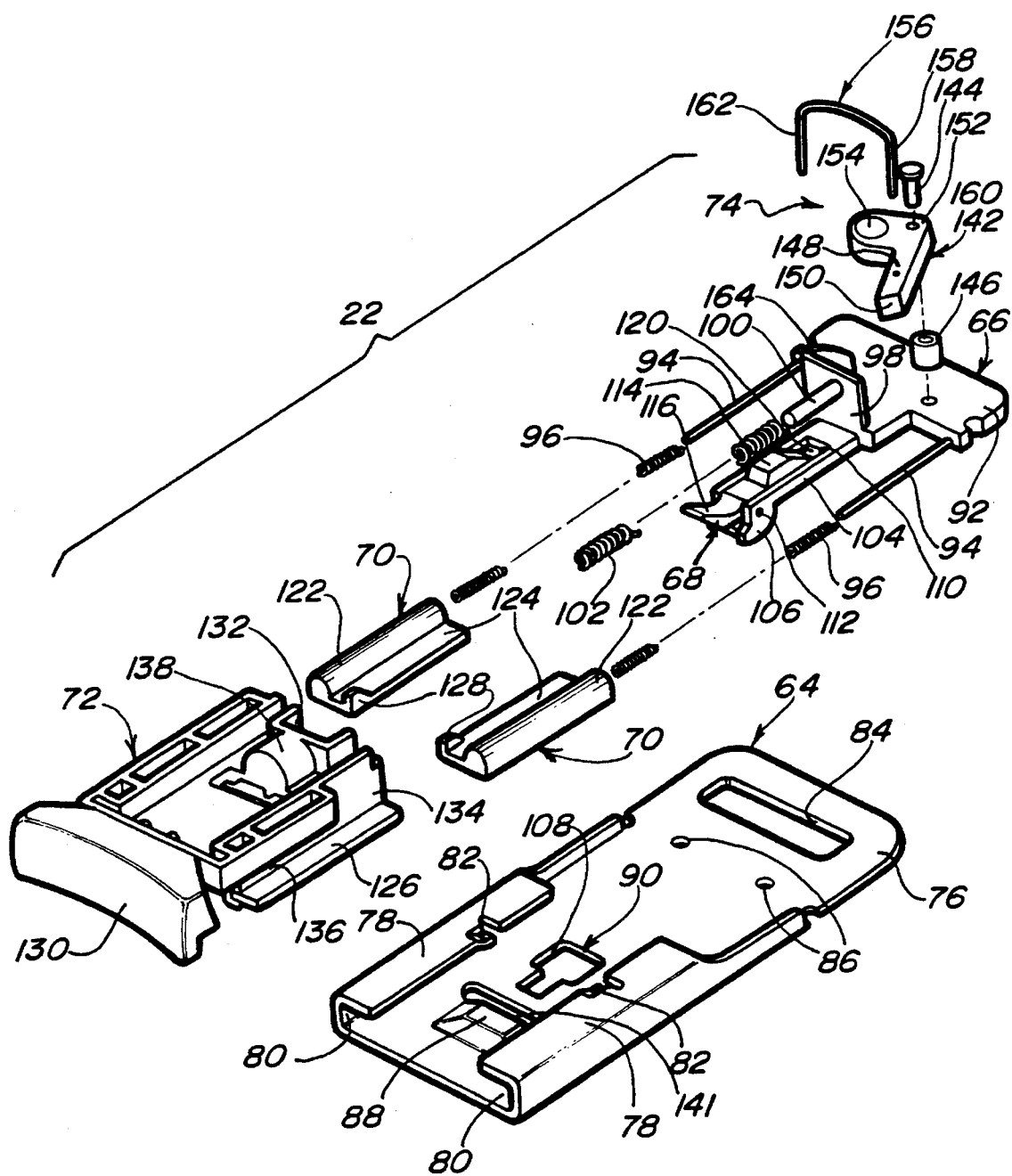
FIG. 3 is an exploded perspective view of the end release belt buckle shown in FIG. 2, with its protective housing removed for greater clarity, and which is equipped with an inertia-sensitive locking mechanism constructed according to one embodiment of the present invention.

With reference to FIG. 1, a portion of the interior passenger compartment of an exemplary automotive motor vehicle is shown to include a seat 10 and a safety belt restraint system having a belt retractor 12 mounted on a vertical pillar of the motor vehicle in a conventional manner. A safety or "seat" belt 14 is shown as a combination of a shoulder belt 16 extending from belt retractor 12 and a lap belt 18. As is shown, shoulder belt 16 is adapted to extend over the shoulder and across the chest of a seat occupant. A tongue plate 20 is retained on safety belt 14 and is adapted to be releasably latched to a belt buckle 22. Belt buckle 22 is mounted to a belt tensioning mechanism 24 that is rigidly mounted to the floor (or other structural portion) of the vehicle. In view of the use of belt tensioning mechanism 24, belt retractor 12 must be capable of inhibiting the withdrawal of safety belt 14 such as, for example, via an inertia-sensitive locking device, concurrent with or prior to actuation of belt tensioning mechanism 24. Preferably, the structure and operation of belt tensioning mechanism 24 are similar to that disclosed in commonly owned U.S. Pat. No. 5,364,129, entitled "Vehicle Safety Belt Tensioning Mechanism", the entire disclosure of which is hereby incorporated by reference.

In general, belt tensioning mechanism 24 is provided to enhance the protection afforded to the seat occupant by the safety belt restraint system. More particularly, belt tensioning mechanism 24 is operable to move belt buckle 22 from the extended "normal" position shown in FIGS. 1 and 2 to a rearwardly "retracted" position when the motor vehicle is subjected to a deceleration which exceeds a predetermined critical value (i.e., immediately after a frontal vehicular collision). Thus, belt tensioning mechanism 24 is adapted to facilitate the removal of "slack" in safety belt 14 for exerting a tensioning load on the seat occupant which acts to physically restrain the seat occupant against seat 10. Moreover, belt tensioning mechanism 24 is operable to effectively "tighten" seat belt 14 before the inertial forces acting on the seat occupant can pull out any "slack" in seat belt 14. In this manner, forward excursions of the seat occupant within the interior passenger compartment of the motor vehicle are significantly minimized. While shown with a combination seat belt 14, it will be appreciated that belt tensioning mechanism 24 can be used in virtually any safety belt restraint system having at least one of a lap belt 18 and a shoulder belt 16 installed within the passenger compartment of the motor vehicle.

Referring to FIG. 2, the primary components of belt tensioning mechanism 24 will now be described. In general, belt tensioning mechanism 24 includes: a lock plate 26 fixed to the vehicle floor structure (or any other suitable frame structure) which has a plurality of sequentially-aligned locking apertures 28 formed therein; a buckle assembly 30 including belt buckle 22 and a latching mechanism 32 having a latch plate (not shown) that is engageable with locking apertures 28 for only permitting uni-directional (i.e., "retractive") linear movement of buckle assembly 30 on lock plate 26; a drive mechanism 34 coupled to buckle assembly 30; a stored energy device 36 that can be selectively actuated for displacing drive mechanism 34 to cause concurrent retractive movement of buckle assembly 30 on lock plate 26; a sensor 38 for sensing the occurrence and magnitude of a vehicular deceleration condition and for generating a deceleration signal indicative thereof; and a controller 40 for actuating stored energy device 36 when the deceleration signal from sensor 38 indicates that the vehicular deceleration is greater than a predetermined critical value (for example, 7–10 g's).

As noted, actuation of belt tensioning mechanism 24 is controlled in response to the deceleration signal generated by sensor 38. Preferably, sensor 38 is located near a front end portion of the motor vehicle so as to instantaneously detect and signal the occurrence of a deceleration condition (i.e., a frontal impact), thereby reducing the reaction time required to retract belt buckle 22 when the deceleration force detected is greater than the predetermined critical value. In motor vehicles equipped with a supplemental restraint air bag system, sensor 38 can be used for controlling sequential or concurrent actuation of belt tensioning mechanism 24 and deployment of the air bag restraint. However, to minimize forward excursions of the seat occupant during air bag deployment, it is preferable to actuate belt tensioning mechanism 24 prior to deployment of the air bag. In either case, the signal generated by sensor 38 is inputted to a suitable on-board electronical controller unit (ECU) 40 which then controls actuation of stored energy device 36 in response to the deceleration signal.

FIG. 2 shows belt tensioning mechanism 24 in a "non-actuated" condition with buckle assembly 30 maintained in its forward "normal" position. However, upon actuation of belt tensioning mechanism 24, buckle assembly 30 is forcibly moved from the "normal" position to a fully "retracted" position whereat a front edge portion of buckle assembly 30 engages a stop rivet 42 extending from lock plate 26. To ensure fast retraction of buckle assembly 30, stored energy device 36 is selected to be capable of moving buckle assembly 30 at a high rate of acceleration (i.e., greater than 200 g's). As such, buckle member 30 will stop abruptly at its fully "retracted" position upon engagement with stop rivet 42 and latch mechanism 32 thereafter prevents forward movement of buckle assembly 30 from the fully "retracted" position.

With continued reference to FIG. 2, drive mechanism 34 includes a piston plunger (not shown) that is retained for movement within an elongated internal chamber 44 of a tubular piston cylinder 46. Drive mechanism 34 also includes a cable 48 having a first end 50 coupled to the plunger and a second end 52 coupled to buckle assembly 30. A grooved reel 54 and idle bearing 56 are rotatably supported on lock plate 26 to guide retractive movement of cable 48. In addition, stored energy device 36 includes a pyrotechnic device 58, housed within a casing 60 that is affixed to lock plate 26, which communicates with a lower portion of piston chamber 44. An electrical signal sent by controller 40 is adapted to ignite pyrotechnic device 58, or a suitable igniter mechanism associated therewith, to forcibly propelling the piston plunger to move upwardly within piston chamber 44, thereby causing buckle assembly 30 to move rearwardly on lock plate 26 from the "normal" position shown toward its fully "retracted" position. To facilitate installation, a secondary latching arrangement is provided which includes a shear plug 62 having pins that are inserted through sets of aligned bores formed in buckle assembly 30 and lock plate 26, respectively. The pins are designed to shear when a predetermined shear load (approximate 220 lbs) is exerted thereon in response to ignition of the pyrotechnic device 58, thereby permitting subsequent retraction of buckle assembly 30.

Referring now to FIG. 3, an exploded perspective view of belt buckle 22 is provided to illustrate the components in greater detail. In general, belt buckle 22 is an "end release" type buckle that is similar to that disclosed in commonly owned U.S. Pat. No. 5,426,834 entitled "End Release Seat Belt Buckle", the disclosure of which is incorporated by reference. More particularly, belt buckle 22 is an assembly of various components and sub-assemblies which include: a base 64; a support block 66 adapted for direct mounting on base 64; a rocker arm 68 supportive for pivotal movement on support block 66; a pair of spring-biased ejector arms 70; a spring-biased push-button actuator 72; and an inertia-sensitive locking mechanism 74. From the construction shown, base 64 is a rigid structural component formed to include a plate segment 76 and a pair of orthogonal flange segments 78 which extend inwardly along opposite lateral sides of plate segment 76. As such, each flange segment 78 defines an elongated longitudinal guide channel 80 and has a downwardly extending stop projection 82 formed thereon. Plate segment 76 is also formed to include an anchor mounting aperture 84, a pair of supporting block mounting apertures 86, a raised latch portion 88 and a generally T-shaped access aperture 90. Anchor mounting aperture 84 is provided for rigidly mounting belt buckle 22 to latch mechanism 32 via a suitable clamping device 85 (FIG. 2).

Support block 66 is shown to include a lateral support segment 92 having locating pins formed on its underside surface (not shown) which are adapted to be inserted (i.e., "snapped") into mounting apertures 86 for fixedly securing support block 66 on plate segment 76 of base 64. In addition, a pair of laterally-spaced spring posts 94 extend forwardly from a front face of lateral support segment 92 for retaining and supporting a first end of an elongated ejector springs 96 thereon. Support block 66 also includes a raised backstop segment 98 having a spring post 100 on which a first end of an elongated return spring 102 is retained. Furthermore, an extension segment 104 projects from a lower portion of backstop segment 98 and terminates in a downwardly stepped lug 106 which is adapted to be retained within a rear cut-out portion 108 of a T-shaped access aperture 90. Extension segment 104 has a shallow channel 110 formed therein with rocker arm 68 mounted on a pivot pin 112 at a distal end of channel 110 for pivotable movement with respect thereto. More particularly, a rear lever portion 114 of rocker arm 68 is retained within channel 110 while a forward lifter portion 116 of rocker arm 68 extends from lug 106 and is adapted to be disposed for pivotal movement within a front portion 118 of T-shaped access aperture 90.

To provide means for normally biasing forward lifter portion 116 of rocker arm 68 to extend into front portion 118 of a T-shaped access aperture 90, a cantilevered beam 120 extends from backstop segment 98 within shallow channel 110 of extension segment 104 and has a distal end that is adapted to act on an underside surface of rear lever portion 114. In addition, a transversed flange rib (not shown) is integrally formed on the underside surface of beam 120 in close proximity to backstop segment 98. Upon installation of support block 66 onto base 64, the rib engages plate segment 76 for forcibly urging the distal end of beam 120 in an upward direction displaced from channel 110 and an engagement with the underside of rear lever portion 114 of rocker arm 68. Such a biasing arrangement is desirable in that it inhibits the propagation of noise (i.e., "rattling") of rocker arm 68 within belt buckle 22. Thus, installation of the locating pins into mounting apertures 86 and retention of stepped lug 106 within cut-out portion 108 of access aperture 90 is operable for positively locating rocker arm 68 relative to base 64.

With continued reference to FIG. 3, ejector arms 70 are shown to be substantially mirror/image components each having a raised lug segment 122 adapted for sliding translational movement within its respective guide channel 80. Spring-biased ejector arms 70 are adapted to assist in ejecting tongue plate 20 from latched engagement with belt buckle 22 upon selective actuation of push-button actuator 72. Each ejector arm 70 also has a lower planar segment 124 which provides a sliding bearing surface upon which outwardly extending wings 126, formed on opposite lateral sides of push-button actuator 72, are supported for sliding movement. In addition, an upwardly extending fin 128 is formed on the inner forward edge of each planar segment 124. Furthermore, an elongated bore (not shown) is formed in the rearward portion of each raised lug segment 122 which is adapted to retain the opposite end of its respective ejector spring 96 therein. Thus, ejector arms 70 are normally biased by ejector springs 96 away from support block 66.

Push-button actuator 72 is a manually-operable release button which includes a finger pad 130 at its front end and an open-ended recessed segment 132 at its rear portion having lower lateral edges defined by downwardly extending rails 134. In addition, wings 126 extend outwardly from rails 134 and define guide slots 136 within which the inwardly bent portions of orthogonal flange segments 78 of base 64 are retained. Thus, actuator 72 is supported for sliding movement relative to base 64 in a manner that is independent of the sliding movement of ejector arms 70. In addition, a bore (not shown) is formed centrally within a cylindrical drum portion 138 of recessed segment 132 and is adapted to support and retain the opposite end of return spring 102 thereon. Thus, actuator 72 is normally biased away from support block 66. Finally, a retainer block (not shown) is integrally formed on the underside of actuator 72 between lateral rails 134 and includes a front cam surface, a rear cam surface, and an intermediate surface formed therebetween. The profile of the retainer block is such that the front cam surface is adapted to assist in latching a locking aperture 140 of tongue plate 20 over a latching edge 141 of latch portion 88 on base 64 while the intermediate surface is adapted to retain tongue plate 20 in such a latched condition. The rear cam surface is configured to act on rear lever portion 114 of rocker arm 68 for pivoting forward lifter portion 116 into lifting contact with tongue plate 20 in response to rearward movement of push-button actuator 72 from its normal "latched" position to a rearwardly displaced "released" position. Such movement of actuator 72 causes lifter portion 116 of rocker arm 68 to forcibly engage and release locking aperture 140 of tongue plate 20 from latched engagement with latch portion 88 of belt buckle 22. As will be appreciated, return spring 102 is adapted to normally bias push-button actuator 72 to its "latched" position.

Figure 4A:
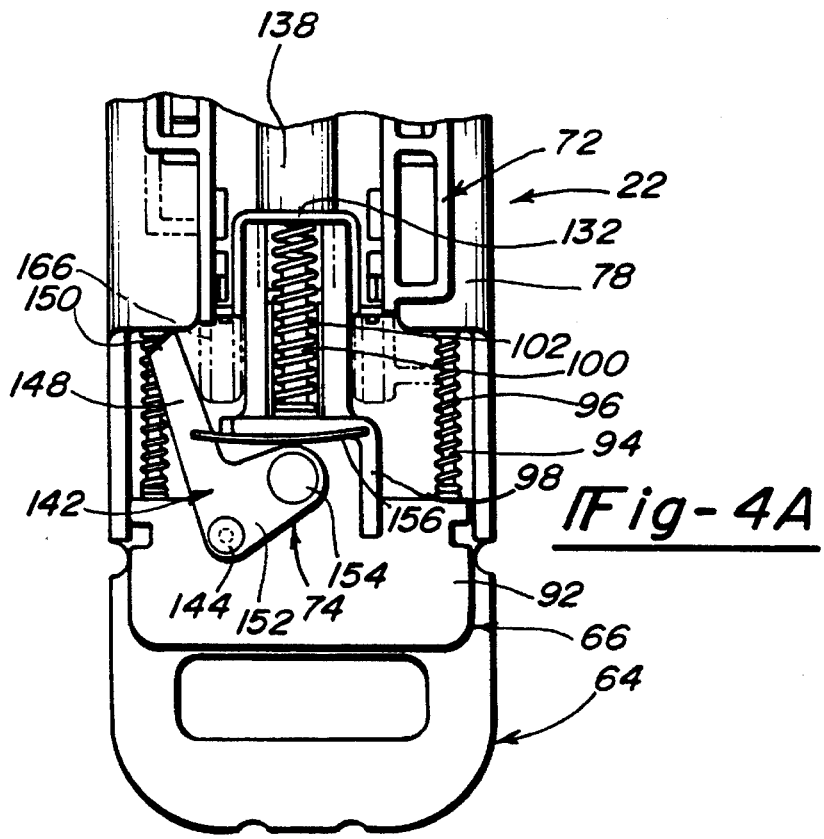
FIG. 4A is a top view of the end release belt buckle shown in FIG. 3 with the inertia-sensitive locking mechanism in its "non-actuated" mode.
Figure 4B:
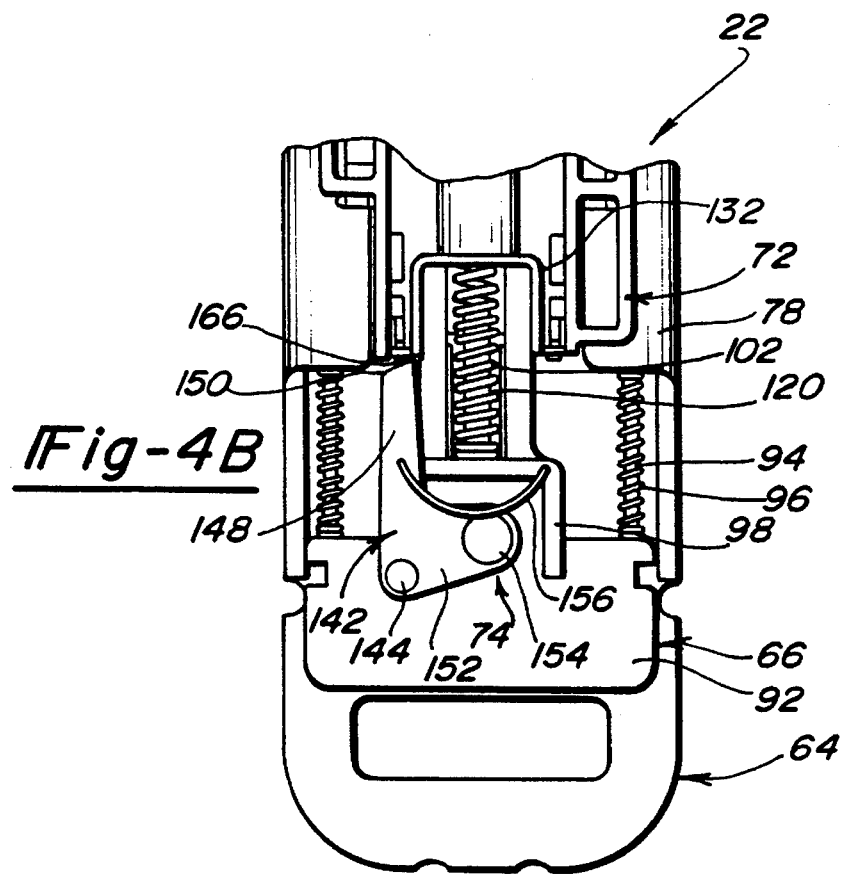
FIG. 4B is a top view of the end release belt buckle shown in FIG. 3 with the inertia-sensitive locking mechanism in its "actuated" mode.

With reference now to FIGS. 3, 4A and 4B, one particular construction for inertia-sensitive locking mechanism 74 is shown. In particular, inertia-sensitive locking mechanism 74 includes an L-shaped pivot arm 142 which is supported for pivotable movement on lateral support segment 92 of support block 66 via a hinge pin 144 and a sleeve spacer 146. Pivot arm 142 includes a long leg 148 having a back angled "blocking" edge 150, and a short leg 152 which includes a weighted member 154. In addition, L-shaped pivot arm 142 is normally biased to the "non-actuated" position shown in FIG. 4A via a suitable biasing mechanism which, in this embodiment, is a generally U-shaped impact spring 156. Impact spring 156 is made of wire and has a first bent leg 158 that is retained in a bore 160 formed in long leg 148 of pivot arm 142 and a second bent leg 162 retained in a bore 164 formed in an upper surface of raised backstop segment 98 on support block 66. When assembled, impact spring 156 is preloaded such that it normally biases pivot arm 142 to the "non-actuated" position shown in FIG. 4A, whereby back-angled blocking end 150 is retained in a position of disengagement relative to a rearward edge 166 of push-button actuator 72. Thus, with inertia-sensitive locking mechanism 74 in its "non-actuated" mode, push-button actuator 72 can be forcibly displaced in opposition to the biasing of return spring 102 from its "latched" position to its "released" position (shown in phantom lines) for permitting selective and intentional release of tongue plate 20 from latched engagement with belt buckle 22. Accordingly, impact spring 156 is used for normally biasing pivot arm 142 to its "non-actuated" position which, in turn, permits use of end release belt buckle 22 in a normal manner.

When sensor 38 signals controller 40 that the motor vehicle has experienced a deceleration condition exceeding the predetermined threshold value, pyrotechnic device 58 is ignited. Such ignition initially results in the shearing of the pins associated with shear plug 62, thereby releasing buckle assembly 30 for retraction on lock plate 26 from its "normal" position (FIG. 2) to its fully "retracted" position. As noted, this retractive movement of buckle assembly 30 is abruptly stopped due to contact with stop rivet 42. In response, the mass of weighted member 154 causes pivot arm 142 to pivot about hinge pin 144, in opposition to the biasing of impact spring 156, such that pivot arm 142 is forcibly moved from the "non-actuated" position of FIG. 4A to the "actuated" position of FIG. 4B. In the "actuated" position, the back-angled blocking edge 150 of pivot arm 142 is aligned to engage rear edge 166 of push-button actuator 72 if push-button actuator 72 is forcibly urged by the inertial forces acting thereon toward the "released" position in opposition to the biasing of return spring 102. Such an inertia-sensitive arrangement effectively blocks push-button actuator 72 from moving to its "released" position during a vehicular deceleration condition. As such, the unintentional release of tongue plate 20 from belt buckle 22 due to the high inertial loading applied to retract belt buckle 22 upon actuation of belt tensioning mechanism 24 will be prevented. Finally, the back-angled profile of blocking end 150 is designed to maintain engagement with rear edge 166 of pivot arm 142 and to bias pivot arm 142 to rotate in a clockwise direction (with respect to FIGS. 4A and 4B) so as to maintain pivot arm 142 in its "actuated" position.

Upon contact between edge 166 of push-button actuator 72 and blocking edge 150 of pivot arm 142, actuator 72 will remain in "movement blocking" contact with pivot arm 142 until the biasing force exerted by return spring 102 on push-button actuator 72 is sufficient to overcome any residual inertia loading and return push-button actuator 72 to its normally biased "latched" position. Once push-button actuator 72 is returned to its "latched" position, the inertia loads exerted on pivot arm 142 will have dissipated such that impact spring 156 is then able to return inertia-sensitive locking mechanism 74 to its "non-actuated" mode of FIG. 4A. It will be appreciated that the particular configuration of pivot arm 142, the mass of weighted element 154 and the amount of preload exerted by impact spring 156 can all be selected in view of the particular vehicular application to provide the requisite reaction times to ensure proper function of locking mechanism 74 in the manner just described.

With particular reference to FIG. 5, an alternative biasing arrangement is shown for an inertia-sensitive locking mechanism 174. Due to the substantial similarity, like numbers are used to designate those components that are similar in function and structure to those described previously with respect to inertia-sensitive locking mechanism 74. In particular, inertia-sensitive locking mechanism 174 is substantially identical in structure and function to that of inertia-sensitive locking mechanism 74 described with reference to FIGS. 3 through 4B, except for the manner in which the biasing is applied to the pivot arm 142. In particular, the alternative biasing arrangement shown in FIG. 5 employs the use of a leaf spring 176 to normally bias pivot arm 142 to its "non-actuated" position. Leaf spring 176 has a first end 178 that is fixed to a lateral flange portion of upstanding backstop segment 98 of support block 66. A second end 180 of leaf spring 176 contacts a bottom edge of short leg 152 of pivot arm 142. Second end 180 of leaf spring 176 maintains contact with short leg 152 of pivot arm 142 throughout the entire range of pivotal movement of pivot arm 142. In a manner similar to that previously described, upon retraction of buckle assembly 30 to its fully "retracted" position on lock plate 26, the inertia causes weighted pivot arm 142 to pivot about pivot pin 144 from its "non-actuated" position to its "actuated" position (shown in phantom) for inhibiting unintended movement of push-button actuator 72 to its "released" position. In this manner, unintentional release of tongue plate 20 from latched engagement with belt buckle 22 in response to high inertial loads being exerted thereon will be prevented, particularly upon retraction of buckle assembly 30. It will be understood that the particular size, shape and material from which leaf spring 176 is made can be selected to provide the requisite preload needed for properly biasing pivot arm 142.

Figure 7:
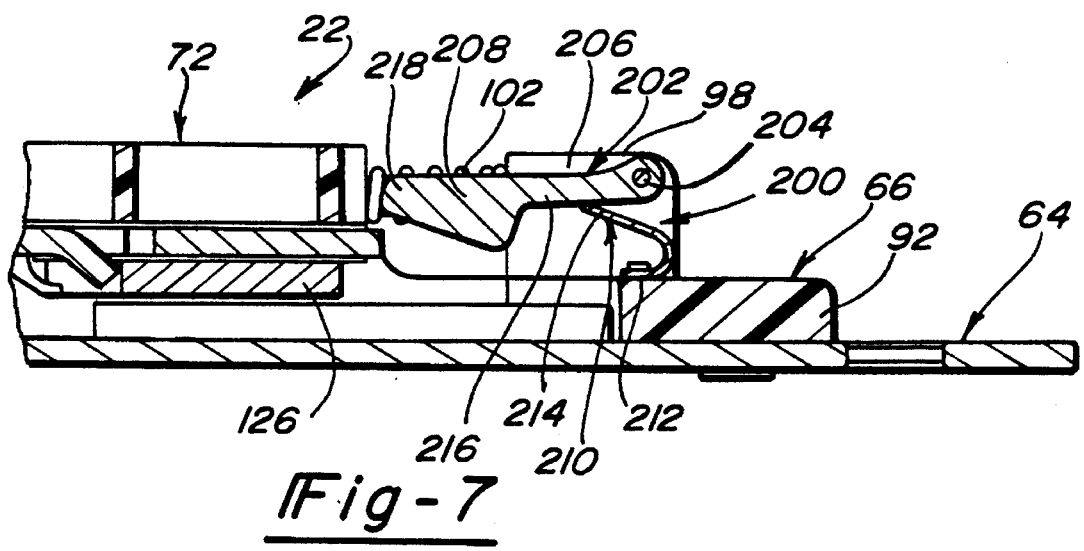
FIG. 7 is a sectional view taken along line 7—7 of FIG. 6 illustrating the inertia-sensitive locking mechanism in its "non-actuated" mode.
Figure 8:
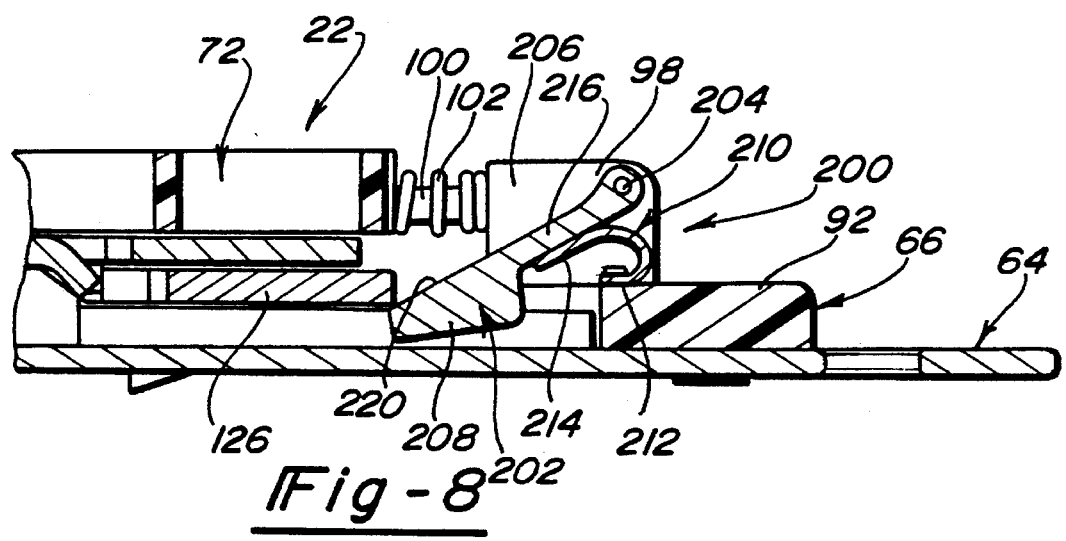
FIG. 8 is a sectional view similar to FIG. 7 showing the inertia-sensitive locking mechanism in its "actuated" mode.

With particular reference now to FIGS. 6 through 8, yet another construction for an inertia-sensitive locking mechanism 200 is shown. As is generally similar to the previous embodiments, a weighted pivot arm 202 is normally biased to a "non-actuated" position (FIG. 7) for pivotable movement to an "actuated" position (FIG. 8) in response to high inertial loads being applied to belt buckle 22 in response to retractive movement of buckle assembly 30. In the particular embodiment shown, pivot arm 202 is mounted on a hinge pin 204 for pivotal movement relative to a lateral flange segment 206 on backstop portion 98 of support block 66. The forward end of pivot arm 202 has an enlarged portion 208 such that pivot arm 202 is configured to naturally rotate in a counter-clockwise direction (as seen in FIGS. 7 and 8). However, a leaf spring 210 is provided for normally biasing pivot arm 202 to the "non-actuated" position of FIG. 7. Leaf spring 210 has a first end 212 mounted to lateral support segment 92 of support block 66, and a second end 214 acting on a lower edge of an intermediate portion 216 of pivot arm 202. In response to a deceleration condition, the forward edge 218 of the pivot arm 202 is rotated counter-clockwise against the biasing of leaf spring 210 for aligning it in "movement blocking" engagement with a corresponding wing 126 of push-button actuator 72. Moreover, such rotation of pivot arm 202 causes wing 126 to ride over an outer surface 220 of pivot arm 202 which, in turn, blocks movement of push-button actuator 72 toward its "released" position for preventing unintentional release of tongue plate 20 from latched engagement with belt buckle 22. If desired, a second inertia-sensitive locking mechanism 200 could be placed in parallel symmetry to the one shown in FIG. 6 to work in concert therewith.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A belt buckle for releasably latching a tongue plate comprising:

a base having a latch portion adapted for releasably locking the tongue plate;

an actuator supported for longitudinal movement relative to said base;

a support block connected to said base;

a release mechanism connected to said support block for selectively releasing the tongue plate from locked engagement with said latch portion of said base in response to movement of said actuator from a latched position to a released position; and a locking mechanism for inhibiting movement of said actuator from said latched position to said released position when said belt buckle is subjected to a deceleration force exceeding a predetermined value, said locking mechanism pivotally connected to said support block remote from said release mechanism for pivotal movement in a plane parallel to said longitudinal movement of said actuator.

2. The belt buckle of claim 1 further including a spring for biasing said actuator toward said latched position.

3. The belt buckle of claim 1 wherein said locking mechanism is an inertia-sensitive device comprised of a pivot arm supported for pivotal movement relative to said base between a non-actuated position permitting movement of said actuator to said released position and an actuated position preventing movement of said actuator to said released position, and biasing means for normally biasing said pivot arm to said non-actuated position.

4. The belt buckle of claim 3 wherein said biasing means is a spring having a first end supported from said base and a second end acting on said pivot arm, said spring being preloaded to exert a biasing force on said pivot arm for normally biasing said pivot arm to said non-actuated position.

5. The belt buckle of claim 3 wherein said pivot arm has a weighted portion adapted to move in opposition to said biasing means in response to said belt buckle being subjected to said deceleration force.

6. The belt buckle of claim 3 wherein said belt buckle is mounted on a belt tensioning mechanism for movement from a normal position to a retracted position in response to detection of a vehicular deceleration force exceeding said predetermined value.

7. The belt buckle of claim 1 wherein said release mechanism further includes a spring for urging the tongue plate to move out of latched engagement with said latch portion of said base in response to movement of said actuator to said released position.

8. A belt tensioning mechanism for use in a motor vehicle safety belt restraint system comprising:

a lock plate anchored to the vehicle;

a belt buckle for releasably latching a tongue plate retained on a safety belt, said belt buckle supported for movement on said lock plate from a normal position to a retracted position, said belt buckle including a base having a latch for releasably locking said tongue plate, an actuator supported for longitudinal movement on said base, a release mechanism for releasing said tongue plate from locked engagement with said latch in response to movement of said actuator from a latched position to a released position, a locking mechanism for inhibiting movement of said actuator to said released position when said belt buckle is moved from said normal position to said retracted position, and a support block connected to said base, said release mechanism connected to said support block and said locking mechanism pivotally connected to said support block remote from said release mechanism for pivotal movement in a plane parallel to said longitudinal movement of said actuator;

sensing means for sensing the magnitude of a vehicular deceleration and generating a deceleration signal indicative thereof;

a drive mechanism coupled to said belt buckle;

a stored energy device coupled to said lock plate and operable for forcibly displacing said drive mechanism so as to cause concurrent movement of said belt buckle from said normal position toward said retracted position; and actuation means for actuating said stored energy device in response to said deceleration signal indicating a vehicular deceleration exceeding a predetermined value.

9. The belt mechanism of claim 8 further including a spring for biasing said actuator toward said latched position.

10. The belt mechanism of claim 8 wherein said locking mechanism is an inertia-sensitive device comprised of a pivot arm supported for pivotal movement relative to said base between a non-actuated position permitting movement of said actuator to said released position and an actuated position preventing movement of said actuator to said released position, and biasing means for normally biasing said pivot arm to said non-actuated position.

11. The belt mechanism of claim 10 wherein said biasing means is a spring having a first end supported from said base and a second end acting on said pivot arm, said spring being preloaded to exert a biasing force on said pivot arm for normally biasing said pivot arm to said non-actuated position.

12. The belt mechanism of claim 10 wherein said pivot arm has a weighted portion adapted to move in opposition to said biasing means in response to said belt buckle being subjected to said vehicular deceleration.

13. The belt mechanism of claim 8 wherein said actuation means is a controller device operable for receiving said deceleration signal from said sensing means and generating an electrical signal for actuating said stored energy device when said deceleration signal is greater than said predetermined value.

14. A safety belt restraint system for use in a motor vehicle comprising:

a safety belt having a tongue plate retained thereon;

a belt buckle for releasably latching said tongue plate, said belt buckle supported for movement from a normal position to a retracted position, said belt buckle including a base having a latch for releasably locking said tongue plate, an actuator supported for longitudinal movement on said base, a release mechanism for releasing said tongue plate from locked engagement with said latch in response to movement of said actuator from a latched position to a released position, a locking mechanism for inhibiting movement of said actuator to said released position when said belt buckle is moved from said normal position to said retracted position, and a support block connected to said base, said release mechanism connected to said support block and said locking mechanism pivotally connected to said support block remote from said release mechanism for pivotal movement in a plane parallel to said longitudinal movement of said actuator; and belt tensioning means for moving said belt buckle from said normal position to said retracted position in response to a vehicular deceleration exceeding a predetermined value, said belt tensioning means comprising sensing means for sensing the magnitude of a deceleration and generating a deceleration signal indicative thereof, a drive mechanism coupled to said belt buckle, a stored energy device operable for forcibly displacing said drive mechanism so as to cause concurrent movement of said belt buckle from said normal position to said retracted position, and actuation means for actuating said stored energy device in response to said deceleration signal indicating a vehicular deceleration exceeding said predetermined value.

15. The safety belt system of claim 14 wherein said locking mechanism is an inertia-sensitive device comprised of a pivot arm supported for pivotal movement relative to said base between a non-actuated position permitting movement of said actuator to said released position and an actuated position preventing movement of said actuator to said released position, and biasing means for normally biasing said pivot arm to said non-actuated position.

16. The safety belt system of claim 15 wherein said biasing means is a spring having a first end supported from said base and a second end acting on said pivot arm, said spring being preloaded to exert a biasing force on said pivot arm for normally biasing said pivot arm to said non-actuated position.

17. The safety belt system of claim 16 wherein said pivot arm has a weighted portion adapted to move in opposition to said biasing means in response to said belt buckle being subjected to said vehicular deceleration.

* * * * *